United States Patent [19]
Tatom

[11] 3,951,445
[45] Apr. 20, 1976

[54] DRAG REDUCTION APPARATUS AND METHOD

[75] Inventor: John W. Tatom, Smyrna, Ga.

[73] Assignee: Vanderbilt University, Nashville, Tenn.

[22] Filed: Aug. 29, 1974

[21] Appl. No.: 501,641

Related U.S. Application Data

[63] Continuation-in-part of Ser. No. 367,850, June 5, 1973, abandoned.

[52] U.S. Cl. .................................. 296/1 S; 105/2 R
[51] Int. Cl.² .......................................... B62D 35/00
[58] Field of Search ................... 296/1 S, 91; 105/2

[56] References Cited
UNITED STATES PATENTS

| | | | |
|---|---|---|---|
| 2,101,793 | 12/1937 | Field, Jr. | 296/1 S |
| 2,112,709 | 3/1938 | Reynolds | 296/91 |
| 3,574,392 | 4/1971 | Hirano | 296/91 |
| 3,596,974 | 8/1971 | Adams | 296/1 S |
| 3,794,372 | 2/1974 | Webb | 296/1 S |
| 3,834,752 | 9/1974 | Cook et al. | 296/1 S |

Primary Examiner—Robert J. Spar
Assistant Examiner—Donald W. Underwood
Attorney, Agent, or Firm—B. J. Powell

[57] ABSTRACT

An air drag reduction apparatus for a tractor-trailer vehicle including a top fairing panel and a side fairing panel movably mounted on the tractor cab so that the fairing panels are in a stowed position at lower vehicle speeds out of interference with the trailer as the tractor and trailer turn substantially with respect to each other at these lower speeds and in a deployed position at higher vehicle speeds to significantly reduce the air drag on the vehicle normally associated with the air gap between the tractor and trailer.

13 Claims, 10 Drawing Figures

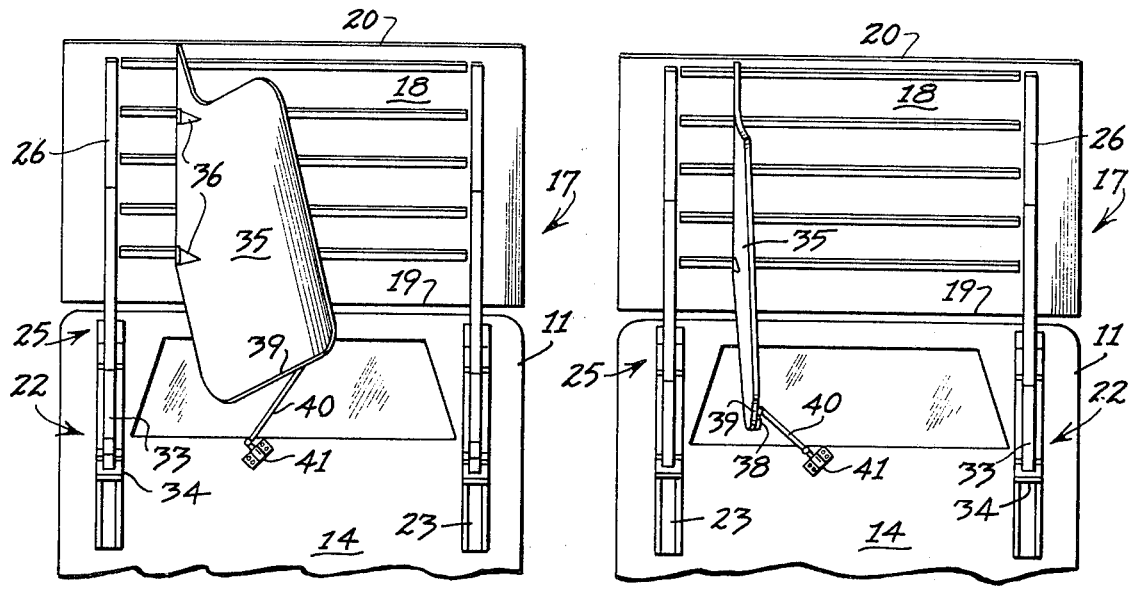
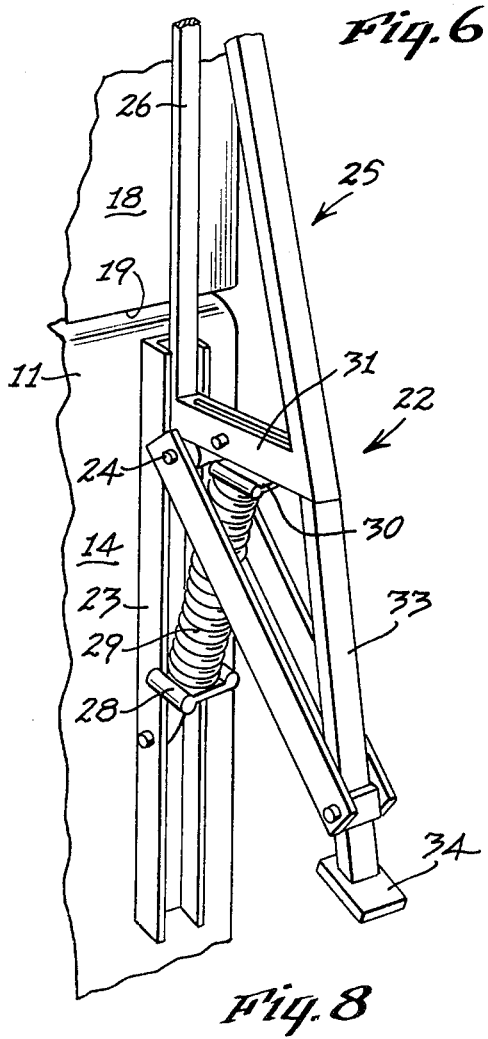
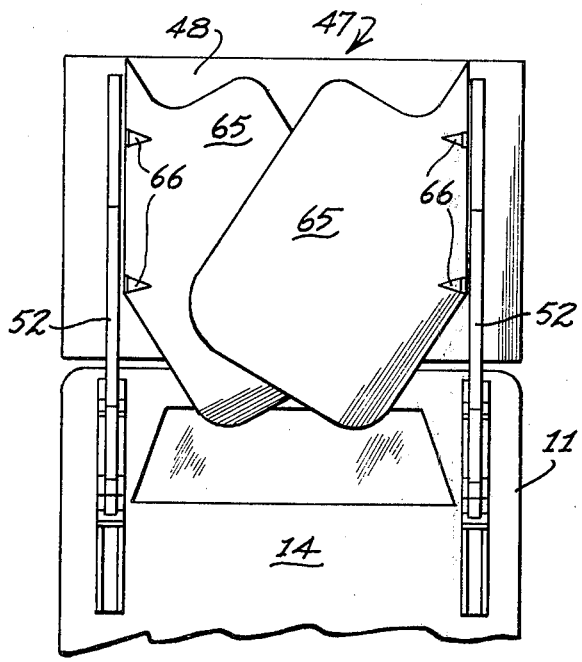

DRAG REDUCTION APPARATUS AND METHOD

CROSS-REFERENCE TO RELATED APPLICATIONS

This application is a continuation-in-part of my co-pending application Ser. No. 367,850 filed June 5, 1973 entitled "Air Drag Reduction Apparatus for Tractor-Trailer," now abandoned.

BACKGROUND OF THE INVENTION

This invention relates to an air drag reduction apparatus for a tractor-trailer vehicle, and more particularly to a drag reduction apparatus automatically deployable to an operative position only at a predetermined high speed of the vehicle.

Air drag reduction apparatuses for tractor-trailer vehicles of various types are known in the art. Examples of some of these drag reduction apparatuses are disclosed in the Saunders U.S. Pat. Nos. 3,241,876; 3,309,131; 3,348,873 and 3,697,120; the Stamm U.S. Pat. No. 2,863,695 and the DeVaughn U.S. Pat. No. 3,425,740.

The above patents disclose air drag reducing devices mounted on the trailer, or the tractor and the trailer, for reducing the drag created in the air gap between the tractor and the trailer. These prior apparatus are rigid structures. Those devices, such as DeVaughn's, which extend the full length of the air gap sacrifice the ability of the tractor to turn, particularly at low speeds. The other devices such as Stamm's or Saunders are fixed with respect to the vehicle and attempt to keep the air gap between the tractor and trailer sufficiently clear to allow the tractor and trailer to turn with respect to each other without interference while reducing the air drag associated with the air gap. Such devices attempt to reduce the air drag by creating an air vortex in the air gap that acts as a fluid fairing to deflect the air flow about the vehicle over the air gap. The primary problems associated with these devices are the difficulty associated with maintaining the vortex, especially for the longer air gaps and for normally encountered cross winds, and the air drag associated with the vortex and the air flowing thereby.

Of the drag reduction apparatuses for tractor-trailer vehicles, or for any other type land vehicles, known to the applicant, none are capable of moving between a stowed position where the apparatus does not interfere with the maneuverability of the vehicle and an operative deployed position automatically, much less being automatically deployed by the wind forces at higher speeds of the vehicle.

SUMMARY OF THE INVENTION

These and other problems associated with the prior art are overcome by the invention disclosed herein by providing an apparatus for reducing the air drag associated with the gap between a tractor-trailer which has a stowed position that does not interfere with the trailer as the tractor turns with respect to the trailer and an operative deployed position that reduces the air drag across the tractor-trailer gap. The apparatus is normally urged toward its stowed position and is automatically moved to its deployed position in response to higher forward speeds of the vehicle. Thus, the maneuverability of the tractor-trailer at low speeds is maintained without interference with the air drag reduction apparatus while the air drag associated with the tractor-trailer gap is minimized at the higher speeds by deployment of the invention. Because the tractor-trailer requires limited maneuverability at the higher speeds, the invention does not interfere with the trailer even though it is deployed.

The apparatus of the invention includes a top fairing panel and one or more side fairing panels. The top fairing panel serves to deflect the air over the top of the air gap while the side fairing panel blocks cross-winds from the air gap. The side fairing panel has a stowed position where it lies generally in the plane of the back of the tractor cab and a deployed position in which it partially blocks the air gap. The top fairing panel also has a stowed position where it lies generally in the plane of the back of the tractor cab and a deployed position in which it deflects the air flowing over the tractor cab over the air gap. Both the top fairing panel and the side fairing panel are resiliently urged toward their stowed positions and are oriented so that they are moved to their deployed positions in response to head wind pressure that is a function of the foward speed of the tractor-trailer.

These and other features and advantages of the invention disclosed herein will become more apparent upon consideration of the following specification and accompanying drawings wherein like characters of reference designate corresponding parts through the several views and in which:

BRIEF DESCRIPTION OF THE DRAWINGS

FIG. 6 is a sectional view taken along the line 6—6 of FIG. 3;

FIG. 7 is a sectional view taken along the line 7—7 of FIG. 4;

FIG. 8 is an enlarged, fragmentary perspective view of one of the mounting devices supporting the top fairing panel in inoperative position;

FIG. 9 is a fragmentary, rear elevation of a tractor cab, disclosing a modified drag reduction apparatus in stowed position; and, FIG. 10 is a side elevational view illustrating a second modification of the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
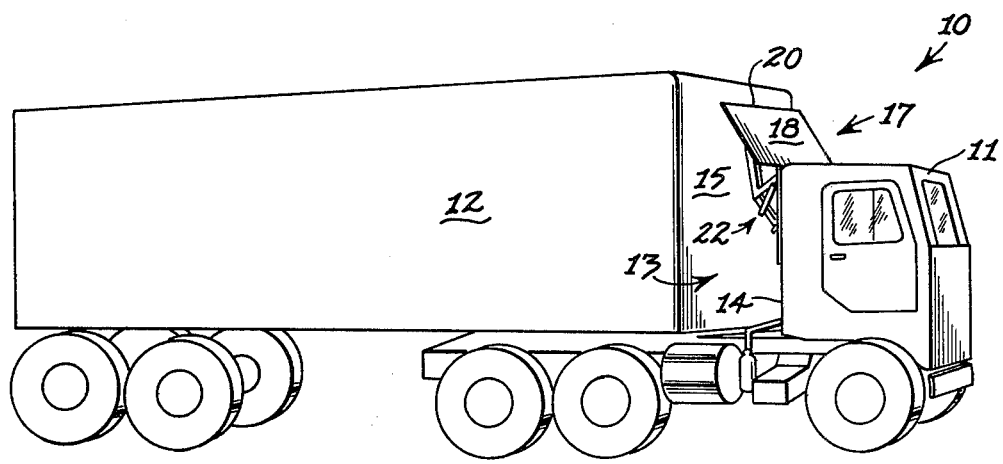
FIG. 1 is a side perspective view of a tractor-trailer vehicle upon which the invention is mounted in deployed position.
Figure 2:
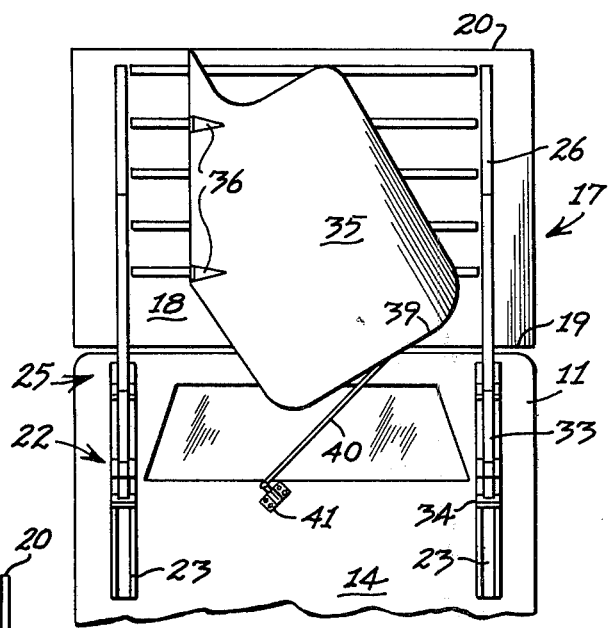
FIG. 2 is an enlarged, fragmentary side elevation of a tractor-trailer vehicle and the invention in its stowed position.
Figure 5:
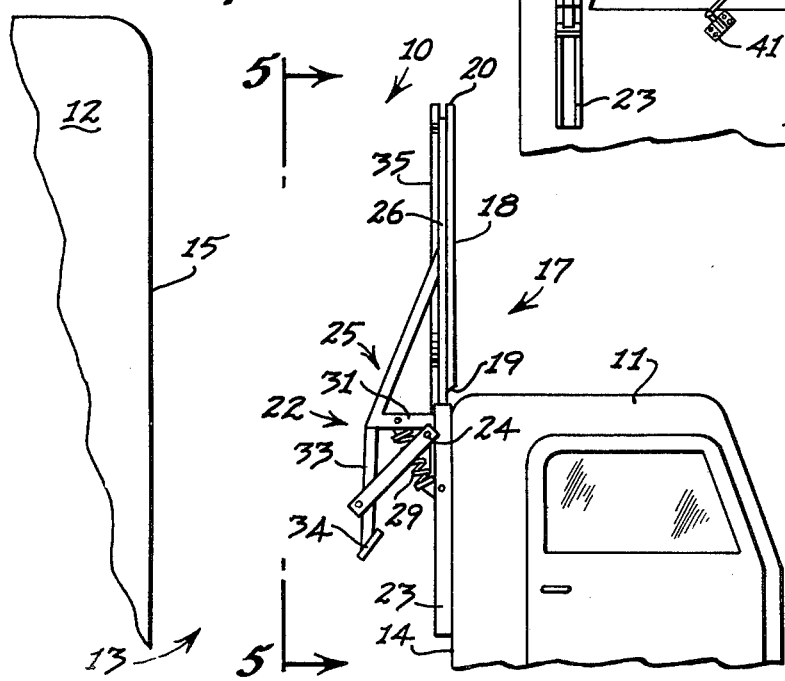
FIG. 5 is a sectional view taken along the line 5—5 of FIG. 2.
Figure 4:
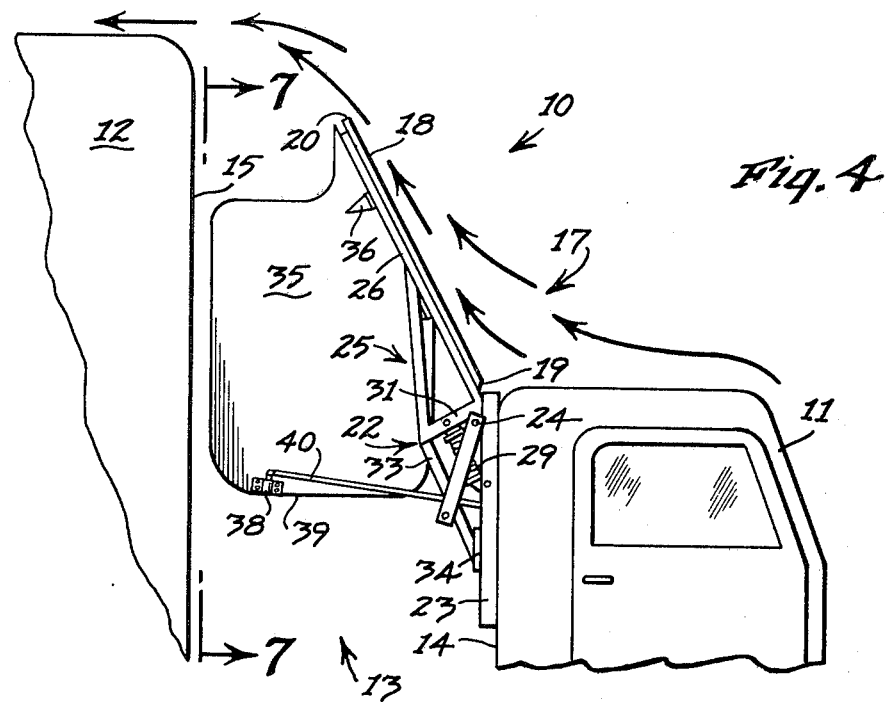
FIG. 4 is a view similar to FIG. 2 in which the invention is fully deployed.

Referring now to the drawings in more detail, FIG. 1 discloses a tractor-trailer vehicle 10, including a tractor cab 11 and a trailer body 12 separated by an air gap 13 defined by the back wall 14 of the cab 11 and the front wall 15 of the trailer body 12. The drag reducing apparatus or device 17 is mounted on cab 11 at the back wall 14; and, includes a top fairing panel 18 and a side fairing panel 35 carried by mounting devices 22. The top and side fairing panels 18 and 35 have a stowed position as seen in FIGS. 2 and 5 in which both panels lie out of interference with the front end 15 of trailer 12 as the cab 11 turns substantially with respect to trailer 12. The top and side fairing panels 18 and 35 also have a deployed operative position as seen in FIGS. 4 and 7 in which the top panel 18 directs the air over the top of the air gap 13 and the side panel 35 blocks cross winds from passing through the air gap 13. The panels 18 and 35 are moved from their stowed to deployed positions in response to a prescribed forward speed of the tractor-trailer vehicle 10.

The top fairing panel 18 is generally rectangular in shape with a front edge 19 and rear edge 20. The side panel 35 is also generally rectangular in shape with a lower edge 39.

As best disclosed in FIG. 8, each mounting device 22 includes a stationary member, such as the channel beam 23, fixed to the rear wall 14. Journalled by pin 24 to the stationary member 23 is a triangular-shaped gusset frame 25, one leg 26 of which is fixed to the bottom surface of the top fairing panel 18 adjacent one side and extending longitudinally of the panel 18. One end of a coil spring 29 is connected to the stationary member 23, by any convenient means, such as spring socket 28, while the opposite end of spring 29 is connected to the short leg 31 of the gusset frame 25 by spring socket 30. The disposition of the coil spring 29 is such that it is under compression normally to urge the gusset frame 25 upward, until the top fairing panel 18 is in a substantially vertical position, as disclosed in FIG. 2. This upright attitude of the fairing panel 18 will be referred to as the stowed or inoperative position.

Figure 3:
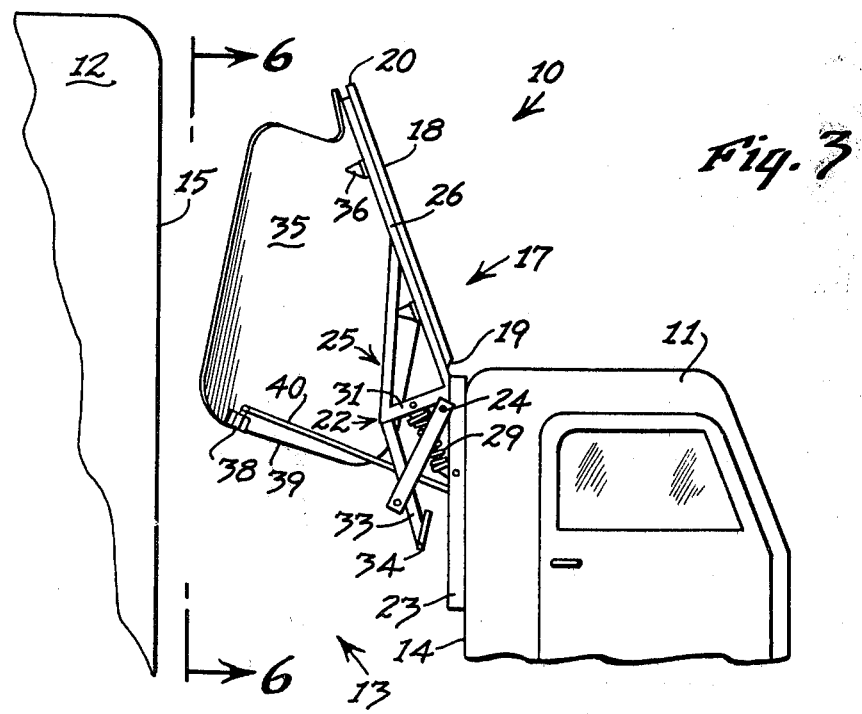
FIG. 3 is a view similar to FIG. 2 in which the invention is partially deployed.

Again, as best disclosed in FIG. 8, fixed to and depending from the junction of the short leg 31 and the hypotenuse member of the gusset frame 25 is a stop arm 33 terminating in an abutment flange 34. The purpose of the stop arm 33 and abutment flange 34 is to limit the downward and rearward movement of the top panel 18, when it is forced rearward by the head wind encountered when the vehicle 10 moves forward with sufficient speed. Thus, when the vehicle 10 has attained sufficient speed, such as 40 mph., the panel 18 will move through an intermediate position, such as that disclosed in FIG. 3, to a fully deployed or operative position disclosed in FIG. 4. In the fully deployed position of FIG. 4, the abutment flange 34 abuts against the channel member 23 to limit further rearward movement of the top fairing panel 18.

The side panel 35 is hinged along its top edge by a hinge element 36, which extends generally perpendicular to the front edge 19 of the top panel 18. A pivotal connector 38, of any convenient type, is fixed adjacent the bottom edge 39 of the side panel 35 for pivotally supporting one end of a link rod 40. The opposite end of the link rod 40 is also connected by another pivotal connector 41 to the back wall 14 of the cab 11. The size, disposition and connection of the side panel 35 to the top panel 18 are such that when the top panel 18 is in its stowed position disclosed in FIG. 2, the side panel 35 is collapsed, flat against the rear surface of the top panel 18. However, as the wind force exceeds the strength of the coil spring 29 to urge the rear panel 18 through the intermediate position of FIG. 3 to the fully deployed position of FIG. 4, the side panel 35 swings down and away from the top panel 18 until the side panel assumes a substantially longitudinal vertical position, as illustrated in FIGS. 4 and 7.

Assuming that the coil spring 29 is pre-located and pre-stressed to yield when the vehicle 10 attains a forward speed of approximately 40 mph., the apparatus 17 will remain in its stowed position as disclosed in FIGS. 2 and 5 for speeds below 40 mph., but for speeds of 40 mph. or greater, the top panel 18 automatically swings rearward under the pressure of the head wind developed by the forward movement of the vehicle 10 through the air. As the vehicle speed gradually increases, the top panel 18 gradually moves rearward, while the side panel 35 gradually unfolds until a speed, such as 45 mph. is attained at which the apparatus 17 assumes its fully deployed position disclosed in FIGS. 4 and 7. In the fully deployed position, the top panel 18 reaches its limit of rearward movement because of the engagement of the abutment flange 34 with the stationary channel member 23. In this maximum deployed position, the attitude of the top fairing panel 18 is such that the air rushing over the top of the cab 11 and impinging against the front surface of the top fairing panel 18 flows in a streamlined manner upward along the front surface of the top panel 18 and over the top edge of the front trailer wall 15 to substantially adhere and flow along the top wall 45 of the trailer body 12. At the same time, side panel 35, in its fully deployed position, extends substantially the full length of the air gap 13 to block the passage of any cross winds through the air gap 13 from one side of the vehicle 10 to the other. Accordingly, both the top fairing panel 18 and the depending side panel 35 in their fully deployed positions substantially reduce the drag of a forward moving vehicle, created by head winds and cross winds.

On the other hand, at speeds below 40 mph., when the apparatus 17 is in its stowed position, the air gap 13 is completely open, as disclosed in FIG. 2, so that the cab 11 is free to maneuver and turn relative to the trailer body 12 without any part of the apparatus 17 striking, and thereby becoming damaged by, the trailer body 12. Furthermore, since the air drag upon the trailer vehicle 12 is substantially reduced and even negligible at lower speeds, there is no need for either the top panel 18 or the side panel 35 to be in their drag reducing or fully deployed positions. Even though the top panel 18 is extending straight up vertically and transversely in the path of the air moving over the top of the forward moving tractor cab 11, it still serves to somewhat reduce the air drag.

It is a further advantage of the apparatus 17 to be mounted solely upon the tractor cab 11, without any connection to the trailer body 12. A typical trucking company has approximately two tractors for every five trailers. Accordingly, the trucking company can obtain the same drag reduction effect using the invention with only approximately 40 percent of the number of conventional drag reducing devices having elements fitted to the trailers alone or to both the trailers and tractors.

Another advantage of this invention is that the apparatus 17 is fully deployed automatically solely by the head wind force, without any additional power means or controls. The operator of the vehicle performs no additional operations other than driving the tractor in order to effect deployment of the reduction apparatus 17.

FIG. 9 discloses a modified apparatus 47 including a top panel 48 supported by the mounting devices 52 upon the rear wall of the cab 11. The top panel 48 is identical to the top panel 18, and is supported in the same manner by the mounting devices 52 which are identical in construction to the mounting devices 22. The main differences in the modified apparatus 47 are that there are two side panels 65, instead of one. The top edges of the side panels 65 are supported by hinge elements 66 to the lower surface of the top panel 48 adjacent the sides of the top panel 48 for swinging movement toward and away from the top panel 48, in a manner similar to the swinging movement of the side panel 35 relative to the top panel 18. Both side panels 65 are connected by link rods, not shown, similar to the link rod 40 to the rear of the cab 14 to effect a similar type swinging motion between the side panels 65 and the top panel 48.

In FIG. 9, the top panel 48 is in its vertical stowed position with the side panels 65 collapsed flat against the bottom or rear surface of the panel 48. When the head wind strikes the apparatus 47 with sufficient force, such as at a forward vehicle speed of 40 mph., to begin compressing the springs, not shown, within the mounting devices 52, the top panel 48 will swing rearward in the same manner as the top panel 18 swings under similar wind forces. As the top panel 48 swings rearwardly, the side panels 65 swing downward away from the top panel 48 and away from each other, until the side panels 65 also assume a longitudinally vertical attitude in fully deployed position, to close off both sides of the air gap 13.

The apparatus 47 is probably slightly more efficient than the apparatus 17, in that the side panels 65 not only prevent cross winds, but also permit the air rushing along the sides of the cab 11 to continue to flow smoothly along the exterior surfaces of the deployed side panels 65 and subsequently to re-attach to the side walls of the trailer body 12, with a minimum of interruption. The side panels 65 also extend almost the full length of the air gap 13. In other words, the fully deployed side panels 65 will have the same appearance as the single panel 35 does in FIG. 4, with the exception of their relative lateral locations.

Where the length of the air gap 13 is small the top fairing panels 18 or 48 may be used without side panels 35 or 65 to deflect the air flow over the top of the air gap. Because the panel 18 or 48 is moved to its stowed position at lower speeds, interference with the front 15 of trailer 12 is prevented as the tractor-trailer vehicle 10 is maneuvered at lower speeds.

In actual tests, devices 17 and 47 have resulted in a 20-25 percent drag reduction with no cross wind, and a 20-30 percent drag reduction in the presence of 5-10 mph. cross winds at truck speeds of 60 mph. It will be noted in FIG. 4 that side panel 35 does not extend downward the full height of the air gap 13. It has been found in wind tunnel tests that the bottom portion of the side panel can be trimmed significantly without appreciable losses in aerodynamic efficiency. Thus, increased drag created by a shorter side panel 35 is minimal.

It will be noted in the apparatus 17, particularly in FIGS. 5-7, that the hinge elements 36, although extending longitudinally of the top fairing wall 18 is not centrally located. Because it has been found that the lateral location of hinge elements 36 relative to the side edges of the top fairing panel 18 is not critical, the hinge elements 36 can be shifted laterally to allow the side panel to move to a stowed position without interference. The width of the top panel 18 is limited by the space available on the cab and the cab width itself. This width may also be limited by a stack or breather, not shown, on one or both sides of the cab 11. The effect of the width of panel 18 on the reduction of air drag is, however, controlled by the width of the trailer. Optimumly, the panel width should be 65-70 percent of the trailer width and centered thereon.

The amount the air must be deflected upwardly from the top of the cab over the trailer is determined by the relative heights between the cab 11 and trailer 12, however, the maximum height of the top edge 20 of panel 18 in the stowed position above the road is limited by a legal height limit (currently 13 feet 6 inches). The amount of upward deflection of the air over the air gap 13 is a function of the angle of the panel 18 with respect to the vertical in its deployed position and the length of the panel 18 from its bottom edge 19 to its top edge 20, however, because the length of the panel 18 has a more significant affect than the angle within a prescribed range, the angle can remain generally constant while the length is varied to accommodate different relative cab-trailer heights. This greatly simplifies manufacture.

Figure 10:
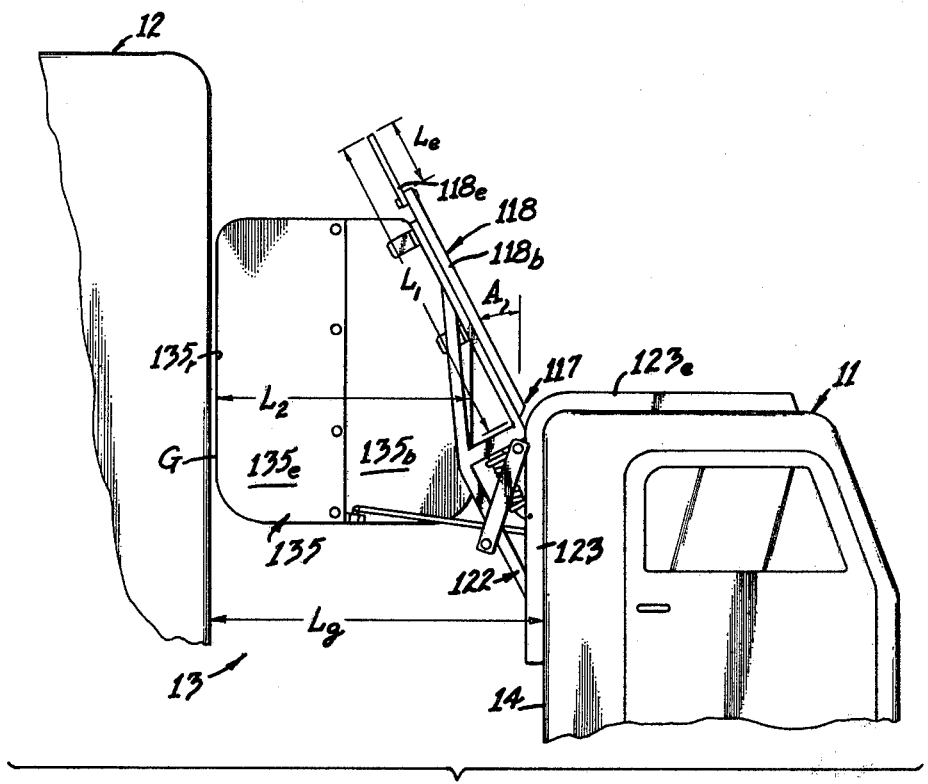

A second modification of the invention designated 117 is shown in FIG. 10. The device 117 is generally the same as the device 17 with a top fairing panel 118, a side fairing panel 135 and mounting devices 122.

Because the length $L_1$ of the top panel 118 has a more significant affect on the deflection of the air over the top of air gap 13, the deflection required for almost all tractor-trailer vehicles can be provided using one angle A of panel 118 with respect to the vertical as seen in FIG. 10 and varying length $L_1$. Panel 118 includes a base portion $118_b$ which is mounted on the mounting devices 122 similarly to panel 18 and an extension portion $118_e$ which is removably attached to the top edge of base portion $118_b$. Thus, the base portion $118_b$ can be standardized and the length $L_e$ of extension portion $118_e$ varied as required to obtain the desired length $L_1$ for panel 118. Alternatively, the length of panel 118 may be made the maximum length $L_1$ that will be needed and the top edge trimmed to obtain the desired length $L_1$.

The length $L_g$ of air gap 13 determines the required length $L_2$ of side fairing panel 135, however, the length $L_g$ varies between different tractor-trailer vehicles. Thus, panel 135 is made with a base portion $135_b$ that is standardized and an extension portion $135_e$ removably attached to the rear edge of base portion $135_b$. The extension portion $135_e$ can be varied in length to produce the desired length $L_2$ for side panel 135. Also, because it is desirable to have the gap G between the rear edge $135_r$ of panel 135 and the front wall 15 of trailer 12 as small as possible, the extension $135_e$ may be made out of a flexible material such as rubber or plastic so that any interference between the trailer 12 and rear edge $135_r$ of panel 135 will be absorbed by extension $135_e$ flexing. It is to be further understood that the extension $135_e$ may also be made to produce a maximum length $L_2$ that will be needed and trimmed to the desired length $L_2$ during installation.

Also seen in FIG. 10 is a roof extension $123_e$ provided on the upper end of each channel beam 123 that projects forwardly over the roof of the cab 11 and is attached thereto. This serves to transfer a significant portion of the force exerted on the beam 123 by panel 18 to the extension $123_e$ and the cab roof. Because the extension $123_e$ is primarily loaded in shear and and the cab roof is relatively strong in shear, the likelihood of damage due to tension loading on the rear wall 14, this wall being relatively weak in tension, is greatly reduced.

Basically, the invention is stowed while substantial turning movement is occurring between the tractor and trailer to prevent interference between the invention and the front end of the trailer. The invention is deployed only when there is little likelihood of substantial turning between the tractor and trailer. Thus, a condition that indicates when there is little likelihood of interference between the tractor and trailer is used to determine when the invention is to be deployed or showed. Because tractor-trailer vehicles cannot stably turn at sharp angles at higher speeds, the higher speed condition is used in the embodiments indicated to determine when the invention will be deployed. This high speed, of course, determines the head wind pressure to deploy the invention.

The air is deflected over the air gap 13 primarily by the top panel itself rather than primarily by an air vortex. Thus, the instability associated with the vortex is eliminated. Moreover, the panel, being a solid structure, has a definite interface with the air flowing thereover rather than an indefinite drag creating zone between the vortex and the air flowing thereby encountered with the prior art. The side panel extends substantially across the length if the air gap so that the maintaining of air within the gap as the vehicle moves is not dependent on the maintenance of an unstable vortex such as that associated with the prior art.

It is to be understood that conditions other than forward speed may be used to determine when to deploy the invention such as the relative rotational position between the tractor and trailer. Also means for indicating forward speed of the vehicle other than head wind pressure may be used to determine when deployment of the invention should be maintained.

The means which drives the invention toward the deployed position may be some means other than head wind pressure such as a fluid cylinder. In some instances, the top fairing panel 18 may be stationary if it is located so that it does not interfere with the trailer as the tractor turns with respect to the trailer while the side fairing panel 35 is moved between its stowed and deployed positions, to prevent interference between the trailer and the side panel.

While specific embodiments of the invention have been disclosed herein, it is to be understood that full use may be made of modifications, substitutions, and equivalents without departing from the scope of the invention.

I claim:

1. A drag reduction apparatus for use with a tractor-trailer vehicle having an air gap between the tractor and the trailer comprising:

fairing means including a top fairing panel defining an air deflecting surface thereon for directing the air flow thereover;

support means carried by the tractor of the tractor-trailer vehicle and movably mounting said top fairing panel for movement of said top fairing panel between a stowed position in which said top fairing panel lies out of interference with the trailer as the tractor and trailer turn with respect to each other; and, a deployed position in which said top fairing panel extends at least partly across the top of the air gap between the tractor and the trailer; and, deployment means including urging means for constantly urging said top panel toward said stowed position, said support means positioning said top panel so that said air deflecting surface projects out into the air flow about the tractor-trailer vehicle as the vehicle moves forward to cause the air flow to exert a force on said top panel urging said top panel toward said deployed position so that the force exerted on said top panel by the air flow exceeds the force exerted on said top panel by said urging means when the vehicle reaches a generally predetermined forward speed to move said top panel from said stowed position to said deployed position and maintain said top panel in said deployed position as long as the vehicle exceeds the predetermined forward speed, said deflecting surface of said top panel directing the air flow across the air gap between the tractor and trailer so as to reduce the air drag characteristics of the tractor-trailer vehicle when said top panel is in said deployed position.

2. In a tractor-trailer vehicle having a gap between the tractor and the trailer and in which said tractor comprises a cab having a roof and a rear wall, a drag-reduction apparatus comprising:

a. a top fairing panel having a front face, a rear face, a leading edge portion, a trailing edge portion and opposite side edge portions, b. first hinge means connecting said leading edge portion to said cab for swinging movement of said top panel about an axis transverse of said cab between a stowed position in which said top panel projects upwardly substantally spaced from the trailer, and a deployed position in which said top panel inclines upwardly and rearwardly from the roof of said cab, and c. spring means operatively connected to said top panel, normally urging said top panel to said stowed position, said spring means being adapted to yield to wind forces above a predetermined value exerted upon the front face of said top panel as said trailer moves forward to cause said top panel to swing toward its deployed position.

3. The invention according to claim 2 further comprising a side panel having a top edge portion, second hinge means connecting the top edge portion of said side panel to the rear face of said top panel for swinging movement toward and away from said top panel, and operator means operatively connected to said side panel to cause said side panel to swing toward said top panel as said top panel moves to its stowed position, and to swing away from said top panel to a substantially longitudinal vertical position depending from said top panel into said gap when said top panel moves to its deployed position.

4. The invention according to claim 3 in which said operator means comprises link means connecting said side panel to the rear wall of said cab.

5. The invention according to claim 3 in which said side panel comprises dual side panels and dual second hinge means mounting said dual panels along the opposite side edge portions of said top panel.

6. The invention according to claim 3 in which the front-to-rear dimension of said side panel in deployed position is slightly less than the front-to-rear dimension of said gap.

7. The invention according to claim 2 in which said top panel in its deployed position is at such an angle to the vertical that the front face of said top panel directs air smoothly upward, over and in flow attachment to the roof of the trailer behind said cab, as said vehicles moves forward.

8. The invention according to claim 2 in which the width of said front panel is substantially equal to the width of said cab.

9. The apparatus of claim 1 wherein said fairing means further includes a side fairing panel defining a side air deflecting surface; said apparatus further including:
connection means interconnecting said top fairing panel and said side fairing panel to cause said side fairing panel to lie in a side panel stowed position in which said side fairing panel lies out of interference with the trailer as the tractor and trailer turn with respect to each other when said top fairing panel lies in its stowed position, to cause said side fairing panel to lie in a side panel deployed position in which said side fairing panel extends into the air gap between the tractor and trailer so that said side air deflecting surface is generally vertical and generally parallel to the line of movement of the vehicle to substantially block air flow generally transversely through the air gap when said top fairing panel lies in its deployed position, and to cause said side fairing panel to move between said side panel stowed and deployed positions as said top fairing panel moves between its stowed and deployed positions.

10. The apparatus of claim 9 wherein said support means includes top panel hinge means pivotally mounting said top fairing panel for pivotal movement about a prescribed top panel pivot axis between said stowed and deployed positions.

11. The apparatus of claim 10 wherein said connection means includes side panel hinge means carried by said top fairing panel and pivotally mounting said side fairing panel for pivotal movement about a side panel pivot axis between said side panel stowed and deployed positions and linkage means connecting said side fairing panel to the tractor of the tractor-trailer vehicle to cause said side fairing panel to be pivoted about said side panel pivot axis as said top panel is pivoted about said top panel pivot axis.

12. A method of reducing the air drag normally associated with the air gap between the tractor and trailer of a tractor-trailer vehicle comprising the steps of:
positioning a top fairing panel with an air deflecting surface thereon adjacent the air gap between the tractor and trailer so that the top fairing panel is movable between a stowed position in which the top fairing panel lies out of interference with the trailer as the tractor and trailer turn with respect to each other, and a deployed position in which the top fairing panel extends at least partly across the top of the air gap between the tractor and the trailer and the deflecting surface of the top panel directs the air flow across the air gap between the tractor and trailer so as to reduce the air drag characteristics of the tractor-trailer vehicle with the top fairing panel projecting out into the air flow generated about the tractor-trailer vehicle as the vehicle moves forward to cause the air flow to exert a wind force on the top panel urging the top panel from the stowed position toward the deployed position; and,
constantly urging the top panel from the deployed position toward the stowed position with a return force such that the force exerted on the top panel by the air flow will exceed the return force exerted on the top panel when the vehicle reaches a generally predetermined forward speed to move the top panel from the stowed position to the deployed position and maintain the top panel in the deployed position as long as the vehicle exceeds the predetermined forward speed.

13. The method of claim 12 further including the steps of:
positioning a side fairing panel defining a side air deflecting surface thereon at the air gap so that the side fairing panel is movable between a side panel stowed position in which the side fairing panel lies out of interference with the trailer as the tractor and trailer turn with respect to each other, and a side panel deployed position in which the side fairing panel extends into the air gap between the tractor and trailer with side air deflecting surface generally vertical and generally parallel to the line of movement of the vehicle to substantially block air flow generally transversely through the air gap;
moving the side panel from the side panel stowed position to the side panel deployed position simultaneously with the movement of the top panel from its stowed position to its deployed position; and,
moving the side panel from the side panel deployed position back to the side panel stowed position simultaneously with the movement of the top panel fairing panel from its deployed position back to its stowed position.

* * * * *